May 14, 1963

D. E. KIRBY, SR 3,089,663

COMBINATION SPINNING AND FLY REEL

Filed May 7, 1962

INVENTOR.
DEAN E. KIRBY, SR.
BY
ATTORNEYS

May 14, 1963     D. E. KIRBY, SR     3,089,663
COMBINATION SPINNING AND FLY REEL
Filed May 7, 1962     2 Sheets-Sheet 2
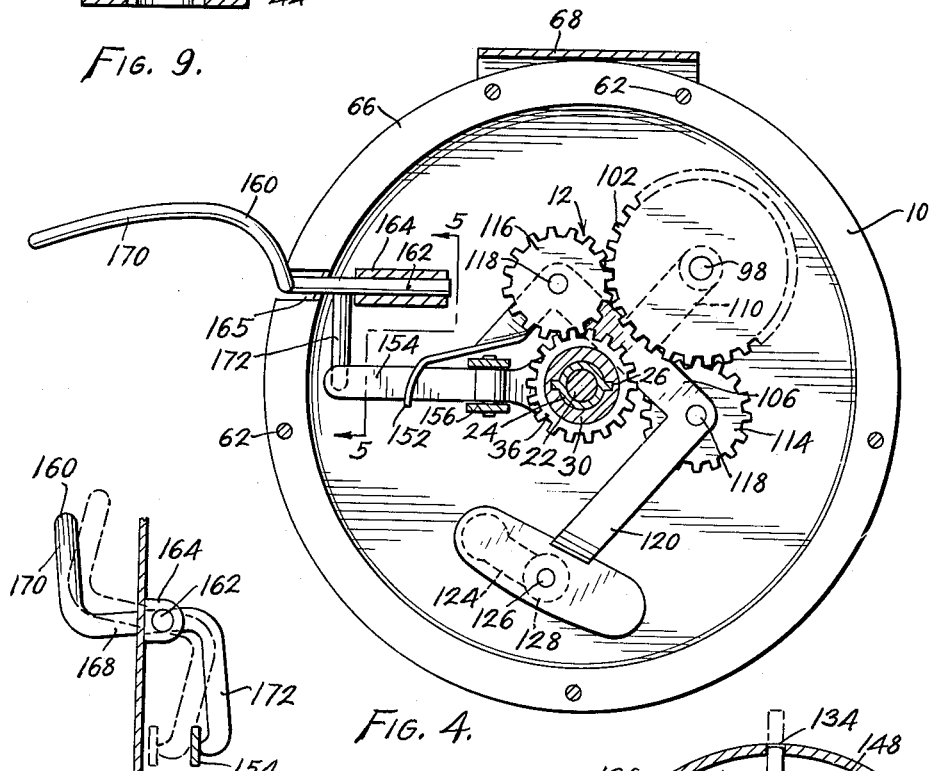
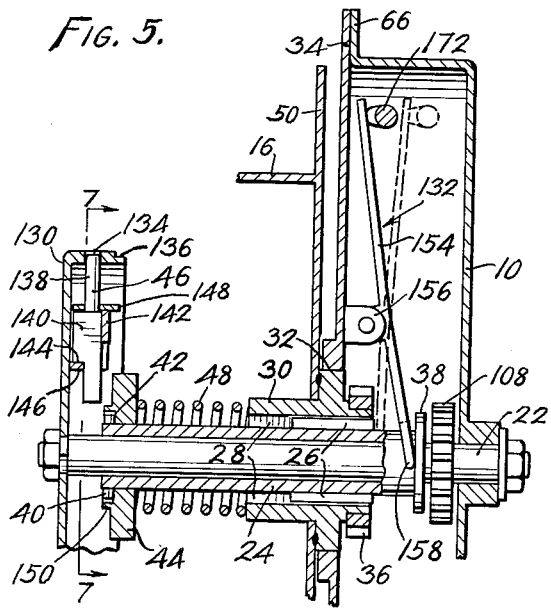
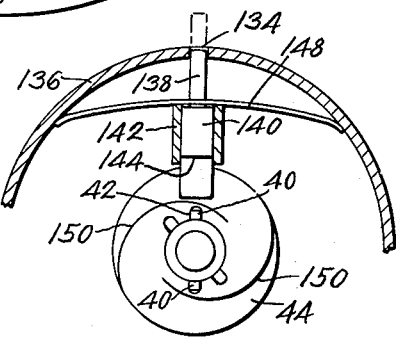
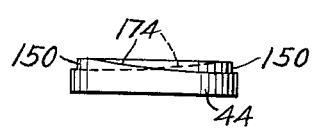
INVENTOR.
DEAN E. KIRBY, SR.
BY
ATTORNEYS

United States Patent Office 3,089,663
Patented May 14, 1963

3,089,663
COMBINATION SPINNING AND FLY REEL
Dean E. Kirby, Sr., 4985 Shoshone St., Denver, Colo.
Filed May 7, 1962, Ser. No. 192,672
9 Claims. (Cl. 242—84.1)

This invention relates to fishing reels and, more specifically, to a combination fly and spinning reel.

Many fishermen, particularly those fishing large rivers, find it desirable to have both a fly outfit and a spinning outfit, along in order to be able to fish all the water most effectively. For example, certain water is ideally suited to fly fishing such as shallow ripples, eddy currents and quiet water near the bank. This same water, on the other hand, is not easily fished with spinning equipment, especially lures which disturb the water and run too deep. Conversely, most large rivers and even medium sized ones that run deep and fast, contain a lot of water that is best covered with spinning tackle primarily because it will reach out farther and is generally considered more effective in deep holes as it will accommodate the heavier lures.

On a lake or other large body of water, carrying two complete outfits is not a great problem as the fisherman is more inclined to confine his activity to a relatively small area such as the inlet or outlet. For the stream fisherman, on the other hand, carrying two different outfits is extremely troublesome as he must usually work up or down stream a considerable distance unless he is fishing with some kind of bait. This usually means that when the occasion arises where a change from the fly to spinning rig or vice versa is in order, the other outfit is a quarter mile or so upstream laying against a log where the fisherman left it.

Several attempts have been made in the past to solve this problem by incorporating the features of both the fly reel and spinning reel in a single combination unit; however, up to the present time, none of these prior art devices have enjoyed much, if any, public acceptance. There are several reasons for this, two of which are most important, namely, the basic difference in the way a spinning reel and a casting reel operate, and the characteristics of the lines which render one suitable for one type of fishing unsatisfactory for the other.

Specifically, many of the prior art combination spinning and casting reels, the latter being characterized by the spool turning as the line pays out while the former turns the spool only when the line is taken on, attempt to use a single spool for both purposes. This, of course, demands a single line for both casting and spin-fishing; whereas, a spinning line should be very light and thin to take advantage of the weight of the lure to get it out a long way while a fly line must be relatively thick and heavy as the weight of the line itself enables the cast to be made with a substantially weightless fly. Thus, in order to use a common line for both purposes, some of the advantages of one or both must be sacrificed.

Spool capacity also becomes a significant problem because more than twenty-five yards of a tapered fly line calls for an excessively large spool, whereas, it is not uncommon to put well over a hundred yards of monofilament spinning line on a small spool. Because of the greater distances to which a lure can be cast with a spinning reel, a spool capacity of twenty-five yards or so is inadequate even though ample for fly casting.

The other factor, namely, the basically different operating principle of the two reels becomes significant in the following respects. Most of the prior art combination casting and spinning reels have attempted to utilize the principle of the spring-wound spool of the type found on the so-called "automatic" fly reel in combination with the spinning reel when, in fact, these two units are completely incompatible. For instance, in an automatic reel, the spring is wound or tensioned when the line is stripped off the spool preparatory to retrieving same. If, however, the line is allowed to move off the spool without turning it to tension the spring as is the case with a spinning reel, then the tension in the spring is exhausted turning the spool during the retrieve. Obviously, this requires that the spring be wound manually at frequent intervals while using the unit in the manner of a spinning reel and this is more troublesome than retrieving the line with a simple crank-operated spool. Also, a spring capable of retrieving the length of line often cast with a spinning reel is prohibitively large and bulky.

The present invention overcomes these difficulties by combining a simple crank-operated fly reel and similarly actuated spinning reel in the same unit. Two separate spools are used, each of which can be supplied with the particular weight and capacity of line necessary for spin and fly-fishing applications. A common crank operates both spools; however, a clutch selectively connects only one spool to the crank at a time. The gear train forming the driving connection between the crank and spools is so designed that a different rate of retrieve is possible with the two spools, the spinning mode usually requiring a more rapid retrieve than the fly mode.

It is, therefore, the principal object of the present invention to provide a novel and improved combination fly-casting and spinning reel.

A second objective is the provision of a device of the type aforementioned that utilizes two separate line-carrying spools which can be supplied with lines ideally suited in weight and capacity to the different modes of fishing for which the combination unit is intended.

Another object of the invention herein disclosed is to provide a fishing reel that eliminates the complexities attendant with trying to adapt a spring-powered spool to a combination device.

Still another objective is the provision of a reel having a common operating crank selectively connectable to a pair of line-carrying spools.

An additional object is to provide a fishing reel that utilizes different retrieve ratios on the two spools.

Further objects of the invention herein disclosed are to provide a combination reel that is compact, rugged, versatile, relatively inexpensive, simple to make and operate, lightweight and decorative in appearance.

Other objects will be in part apparent and in part pointed out specifically hereinafter in connection with the description of the drawings that follows, and in which:

FIGURE 4 is a section taken along line 4—4 of FIGURE 1;

FIGURE 5 is a fragmentary section taken along line 5—5 of FIGURE 4;

FIGURE 6 is a fragmentary diametrical section similar to FIGURE 1 but showing the bail mechanism in retracted position;

FIGURE 7 is a fragmentary section taken along line 7—7 of FIGURE 6;

FIGURE 8 is a side elevation of the cam that extends the bail; and

FIGURE 9 is a diametrical section through the cam of FIGURE 8.

Figures 1, 2, 3:
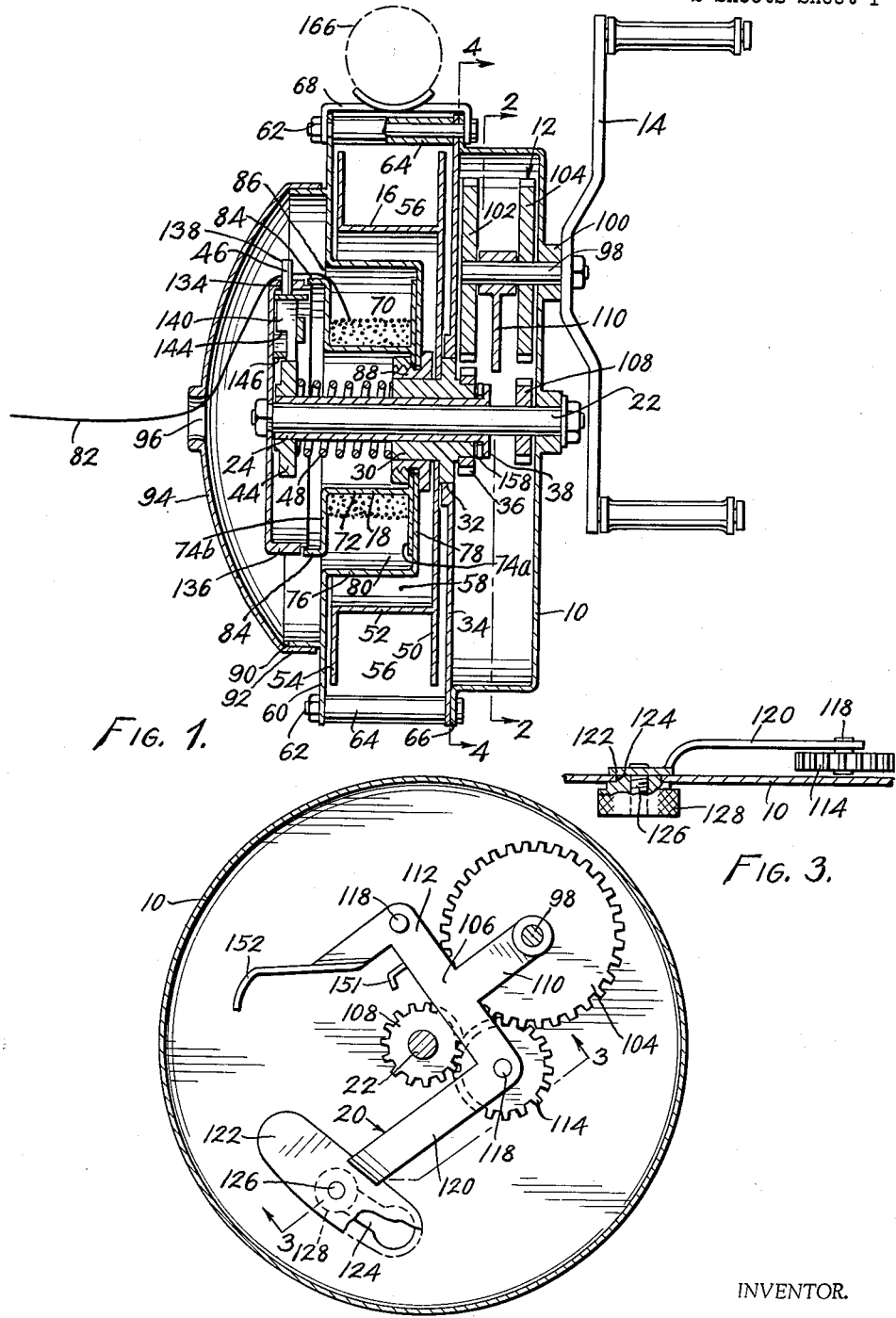
FIGURE 1 is a diametrical section showing the complete combination fly-casting and spinning reel of the present invention.
FIGURE 2 is a section taken along line 2—2 of FIGURE 1.
FIGURE 3 is a fragmentary section taken along line 3—3 of FIGURE 2.

Referring now to the drawings for a detailed description of the invention and, particularly, to FIGURES 1-4, inclusive, for this purpose, the reel will be seen to include a gear housing 10 containing a drive train that has been designated in a general way by numeral 12 which operatively interconnects a crank 14 with either a rotatable fly-line spool 16 or a pick-up 46 associated with a non-rotatable spinning line spool 18 depending on the position of the clutch assembly that has been referred to broadly with reference numeral 20. The gear case 10 is generally cup-shaped and is provided with a centrally-located rotatable shaft 22 on which is mounted a relatively rotatable sleeve 24 that can also move axially relative to rotatable shaft 22. Splines 26 are provided on the outside of the sleeve which are received within corresponding grooves 28 inside the hub 30 of rotatable spool 16. This hub 30 is mounted for rotation inside central opening 32 of the coverplate 34 for the gear case 10. Inside the gear case, a spur gear 36 is carried by hub 30 for rotation therewith adjacent the coverplate. Sleeve 24 has an annular flange 38 on its inner extremity on a pair of radially-extending pins 40 on the outer end thereof that are received within corresponding radial slots 42 in the face of the cam disk 44 which extends the bail or pick-up element 46 of the spinning reel mechanism. A compression spring 48 is mounted on sleeve 24 between the abutments provided by the inner face of the cam disk 44 and the outer end of the hub 30. This spring 48 normally biases the sleeve 24 into the extended position of FIGURE 1.

The rotatable fly-line spool 16 comprises a circular disk 50 fastened centrally to hub 30 and extending outwardly therefrom in parallel relation to the gear case cover 34 but on the outside thereof, a generally cylindrical flange 52 spaced inwardly from the outer circumferential edge of the disk 50 and a radial flange 54 depending from the cylindrical flange in spaced parallel relation to the disk cooperating therewith and with said cylindrical flange to define a circumferential channel 56 adapted to receive a fly-line (not shown) wound thereon. These same elements also cooperate to define a central cylindrical cavity 58 (FIGURE 1) within which the non-rotatable spinning line spool 18 is received.

The radial flange 54 of the fly-line spool is covered by a circular face plate 60. This face plate is the same diameter as the cover plate 34 enclosing the gear case and both of these elements extend beyond the outside of the fly-line spool 16 where they are attached to one another in spaced parallel relation by a plurality of bolts 62 and tubular spacers 64. The spacers maintain a fixed spaced relation between the cover plate and face plate as well as providing smooth-surfaced guides for the fly line. The cup-shaped gear case 10 carries a radial flange 66 through which the bolts 62 pass thus fastening the cover plate 34 thereto. A reel shoe 68 adapted to fasten onto a conventional reel seat on the fishing rod (not shown) is fastened between a pair of the bolts as shown in FIGURES 1 and 4 in position to cover a small portion of the circumferential line groove in the fly-line spool.

The center of the face plate 60 is offset to produce cup-shaped cavity 70 that is recessed within the slightly larger cavity 58 formed inside the fly-line spool 16. The spinning line spool 18 includes a tubular wall portion 72 having radial flanges 74a and 74b on both sides thereof that are centrally located in the cup-shaped cavity 70 lying in spaced relation to the cylindrical sidewall 76 and bottom 78 of face plate 60, thus defining an annular cavity 80 into which the spinning line 82 is wound. The inner radial flange 74a extends inwardly beyond tubular hub-forming wall 72 to provide means for detachably mounting the spool 18 on two-part sleeve bearing 88. The free edge 84 of the outer radial flange 74b is turned outwardly to leave a continuous circular line slot 86 through which the spinning line 82 is wound on and off the spool between said outturned edge which is smooth and preferably rounded as shown so as to not tear or snag the line.

The bottom 78 of the cup-shaped cavity 70 is centrally apertured and a two-part sleeve bearing 88 is mounted in the central opening journalling the hub 30 of the fly-line spool for rotation therein. The face plate 60 also carries a forwardly-projecting annular rib or flange 90 surrounding the cup-shaped cavity but spaced outwardly therefrom that receives the peripheral flange 92 of dome-shaped cover 94 frictionally. Cover 94 has a central aperture 96 therein with rounded edges that passes the spinning line 82 onto the outside of the reel after it emerges from circular line slot 86.

The crank 14 is fastened to one end of an eccentrically-located shaft 98 journalled for rotation within boss 100 provided on the exterior of the gear case. The crank is of the double-ended type to facilitate the reeling functions and is, of course, mounted outside the gear case. Eccentric shaft 98 lies in spaced parallel relation to shaft 22 and carries a pair of spur gears 102 and 104 that are separated from one another by rocker arm 106 of the clutch assembly 20. Gear 102 of the drive train 12 is coplanar with gear 36 carried by the hub 30 of the rotatable fly-line spool although it does not mesh with the latter. Similarly, gear 104 is coplanar with a spur gear 108 carried by shaft 22 but these gears do not mesh with one another.

Rocker arm 106 of the clutch mechanism has a T-shaped portion, the stem 110 of which is pivotally mounted on eccentric shaft 98 while opposite extremities of the cross bar 112 carry a pair of spur gears 114 and 116. One of the latter spur gears, namely, gear 114 is coplanar with gear 104 mounted on shaft 98 and continuously meshes with the latter while the other gear 116 is coplanar with gear 102 and continuously meshes therewith. Both gears 114 and 116 are rotatable on stub shafts 118 depending from the stem 112 of the T-shaped portion of rocker arm 106.

The rocker arm has a shift lever 120 that forms a part thereof and carries a slide-plate 122 on its free end which covers slot 124 in the face of the gear case and prevents dirt and other foreign matter from getting into the gears. A screw 126 is carried by the slide plate 122 in position to project through slot 124 onto the exterior of the gear case where a knurled knob 128 is threaded thereon. The slot 124 is so positioned and shaped that with the screw 126 and associated knob in one extremity thereof, rocker arm 106 is shifted to place gear 114 in meshed engagement with gear 108 carried by shaft 22. It is this position of the clutch mechanism 20 that has been illustrated in FIGURE 2 completing a driving connection between crank 14 and the bail-carrying pick-up mechanism 130 for the spinning line 82 that will be described in detail presently.

Conversely, when screw 126 is in the opposite extremity of slot 124, i.e. that shown in FIGURE 4, gear 114 is disengaged from gear 108 rendering the pick-up drive mechanism inoperative while, at the same time, moving gear 116 into meshed engagement with gear 36 carried by the hub 30 of rotatable fly-line spool 16. Thus, a driving connection is completed from the hand crank 14 to the fly-line spool 16. More specifically, crank 14 turns shaft 98 which in turn rotates gear 102 and gear 116 that is continuously meshed with the latter although mounted on rocker arm 106. Gear 116 is now meshed with gear 36 carried by the hub 30 of the rotatable spool 16 which, of course, turns thereby retrieving the fly-lines. The fly-line is stripped off the spool 16 by hand as is the case with fly reels. Obviously, when fly-line is stripped off of spool 16, the entire mechanism just described is back-driven; however, this also is common to all fly reels of the hand-operated type as contrasted with the so-called "automatic" fly reels.

It is significant to note that as hub 30 is turned, it causes sleeve 24 and bail-extending cam disk 44 to turn also because of the splined coupling between said hub and sleeve. This is important because it provides the means for keeping the bail 46 extended to hold the spinning line 82 wound on spool 18 while the fly-line is being used as will now be explained in connection with FIGURES 1, 6, 7, 8 and 9.

Whenever the fly-line is in use, the bail retraction mechanism which has been indicated in a general way by numeral 132, occupies the dotted line or inoperative position of FIGURE 6 releasing the sleeve 24 to move into the extended position of FIGURE 1 under the bias of compression spring 48. With the sleeve extended, bail-extending cam disk 44 moves into engagement with the bail element 46 that is mounted for radial reciprocal movement through an opening 134 in the annular skirt 136 encircling the pick-up mechanism 130. The bail includes a pick-up pin 138 that projects through opening 134 and is carried by a slide block 140 which moves within a guideway 142 provided for the purpose on the inside of cup-shaped pick-up element 130 as shown most clearly in FIGURE 7. A step 144 is cut in the slide block 142 that engages a stop 146 which limits the extent to which the bail will retract. A leaf spring 148 having an opening therein sized to pass the pick-up pin 138 is bowed across the inside of the cup-shaped pick-up element 130 between spaced points on the annular skirt 136 and in overlying relation to the slide block 140 thus normally biasing the bail 46 into the retracted position of FIGURES 6 and 7.

The outer face of the cam disk 44 is provided with a pair of diametrically-positioned involuted or spirally-shaped cam surfaces 150 that pick-up the inner end of the slide-block 140 when the latter is in retracted position and move it out onto the circular periphery of said disk upon relative clockwise rotation of the latter as viewed in FIGURE 7. In other words, even with the bail-retraction mechanism 132 occupying the dotted line in operative position of FIGURE 6, compression spring 48 cannot move sleeve 30 into the fully extended position shown in FIGURE 1 because the outer face of the cam disk 44 will first engage the retracted slide block 140. The slide block, however, is now in position to be picked up by the cam surface 150 when the cam disk is turned relative thereto. Then, as soon as the cam surface has carried the slide block out onto the periphery of the disk in opposition to the force exerted thereon by leaf spring 148, the sleeve is freed to move into fully-extended position with the cam disk snapping into place underneath the slide block. It is this position that is shown in FIGURE 1. Note that once the slide block is riding on the peripheral edge of the cam disk, it cannot again move into retracted position until the bail-retraction mechanism 132 is moved into the full line position of FIGURE 6 thereby withdrawing the cam disk from underneath the slide block and enabling the leaf spring to once again retract the bail.

Now, with the gear train 12 operatively connected to turn the fly-line spool 16 as shown in FIGURE 4, shaft 22 and the gear 108 carried thereby are disconnected from the crank 14 and meshed gears 102 and 114. In this position the spinning line 82 is not being used and will be completely wound onto spool 18 except for the free end thereof which ordinarily will carry a small swivel that will not pass through opening 96 in the cover 94 or, perhaps, the lure is left attached to the line if it is a small one. Most fishermen prefer to leave the end of the spinning line fitted as above with something that will prevent it from winding completely upon the spinning-line spool as it is then immediately available for use without having to remove the cover and rethread the line through the hole therein. Also, there is less chance of the line becoming tangled.

When the fly line is being used, shaft 22 should not turn; therefore, a lock 151 (FIGURE 2) is carried by the rocker arm 106 that locks into the teeth of gear 108 and prevents the latter from turning under the friction exerted thereon by sleeve 24 whenever the clutch mechanism is in the position of FIGURE 4 driving the fly spool. This stops all rotation of the bail 46, pick-up element 130, shaft 22 and gear 108 while the cam disk 44 turns underneath the slide block 140 maintaining the latter in extended position so that the spinning line will not unwind off spool 18.

Before describing the operation of the spinning function of the reel, one remaining point should be mentioned in connection with the fly reel function and reference will be made to FIGURES 4 and 6 for this purpose. If the bail retraction mechanism 132 happens to be actuated and wound from inoperative to operative position (full lines in FIGURE 6) while the gear train is connected to drive the fly-spool 16, sleeve 24 will be retracted withdrawing the cam disk from underneath the slide block 140. This, of course, allows leaf spring 148 to retract the pick-up pin and the spinning line is free to unwind off of spool 18. To prevent this from occurring, the rocker arm 106 is provided with an integrally-formed stop-forming foot 152 that moves into position against the rocker arm 154 of the bail retraction mechanism 130 preventing the latter from moving into the full-line operative position of FIGURE 6 whenever the gear train is connected as shown in FIGURE 4 to drive the fly-line spool.

Next, with particular reference to FIGURES 1, 2, 4, 5 and 6, the spinning function of the reel will be set forth in detail. Screw 126 and the associated knurled knob 128 are moved to the opposite extremity of slot 124 disengaging gear 116 from gear 36 while, simultaneously meshing gear 114 with gear 108. When this occurs, stop-forming foot 152 is retracted from engagement with rocker arm 154 of the bail-retraction mechanism 132 thereby releasing the latter for movement into operative posiiton. The bail 46 is, however, still extended due to the fact that cam disk 44 rides underneath the slide block 140 and compression spring 48 tends to maintain this condition.

Before the spinning line 82 can be released it is, therefore, necessary to withdraw the cam disk from underneath the slide block so that spring 148 can retract the pick-up pin 146 of the bail. This is accomplished by radial rocker arm 154 which is mounted within clevis 156 attached to the cover plate 34 for rockable movement about an axis intermediate the ends thereof. The inner extremity of rocker arm 154 is bifurcated as at 158 to receive sleeve 24, the forked end of said arm engaging the annular flange or collar 38 on the inner end of the sleeve thus providing means for retracting the latter against the bias of the compression spring 48 when rocked from the dotted line into the full line position of FIGURE 6.

The operating lever 160 by which the bifurcated rocker arm is moved from inoperative into operative position includes a shank portion 162 that is rotatably mounted in a sleeve 164 fastened to the gear case for rotation on an axis paralleling the rocker arm which said operating lever actuates. This shank portion extends forwardly through an opening 164 in the gear case 10 in substantially parallel relation to the fishing rod 166 (dotted lines in FIGURE 1) to which the reel is attached. At the point where the shank portion emerges from the gear case it is bent in the direction of the rocker arm 154 to product an offset portion 168 and then forwardly again to provide an arcuate finger-hold 170. The reel is fastened to the reel seat of the rod at a point behind the handle grip (not shown) which places finger-hold 170 in position to be grasped by the little finger underneath the rod. Thus, it will be evident from an examination of FIGURES 4 and 5, that lifting up on the finger-hold with the little finger will rotate shank-portion 162 clockwise as viewed in FIGURE 5. A lever arm 172 depending from the shank-portion provides the operative link between the operating lever 160 and the rocker arm 154.

Accordingly, with the gear train connected as in FIGURE 2 to render the fly-line spool inoperative while, at the same time, driving shaft 22, raising operating lever 160 from the full line position of FIGURE 5 to the dotted line position thereof will rock the rocker arm 154 about its axis retracting sleeve 24 and the cam disk 44 against the bias of spring 48 freeing the bail 46 to retract under the influence of leaf spring 148. When this occurs, the spinning line 82 is free to unwind off stationary spool 18 axially much in the same manner as thread flows from a bobbin in a sewing machine which, of course, is characteristic of spinning reels. In actual use, the spinning line is threaded through the line guides of the rod and a lure is secured to the free end. The lure is initially located quite close to the tip of the rod while the bail is still extended. Then the back-cast is made bending the rod rearwardly under the weight of the lure at the tip thereof. As soon as the rod springs forwardly, the operating lever is actuated to retract the bail and permit the line to flow freely off the stationary spool.

The retrieve simply requires releasing the operating lever and unwinding in the line with crank 14. As soon as the operating lever 160 is released to the full line position of FIGURE 5, compression spring 48 will return the cam disk and sleeve to the point where the inclined tracks 174 on the face of the cam disk rest against the slide block. Rotating the cam disk by driving shaft 22 with the crank causes the sleeve and disk to retract once again a slight amount while the slide block follows one of the inclined tracks and, at the same time, is being moved into extended position by the involuted cam surfaces 150. At most, one complete revolution of the cam disk is all that is required to permit the slide block to snap into place where it can be picked up by the spiral cam surface and moved by the latter out onto the periphery of said cam disk. Once the pick-up pin 138 of the bail 46 is extended, it will pick up the line 82 and wind it back onto the stationary spool 18 preparatory to another cast. While this is happening, the fly spool is completely inoperative. Note that shaft 22 and sleeve 24 turning inside hub 30 of the fly-spool merely tend to wind the fly-line onto said spool. Ordinarily, when the fly-line is not in use, it has its free end dead-ended at some convenient place on the rod or reel which stops the fly-line spool and prevents its turning at all.

Having thus described the several useful and novel features of the combination fly and spinning reel of the present invention, it will be seen that the several worthwhile objectives for which it was designed have been achieved. Although but a single specific embodiment of the invention has been illustrated in the accompanying drawings, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. The combination crank-operated spinning and fly reel which comprises, a stationary spool having a tubular hub terminating at both ends in radial flanges defining a circumferential groove with said hub, a first shaft journalled for rotation coaxially of the hub of the stationary reel leaving an annular space therebetween, disk-shaped bail carrying means attached to one end of the first shaft for rotation therewith in a plane parallel to one of the radial flanges of the stationary spool, bail means carried by said bail-carrying means for radial movement between a retracted position lying wholly inside the peripheral edge of one of the radial flanges on the stationary spool and an extended position projecting beyond said peripheral edge, spring means interconnecting said bail-carrying means and bail means biasing the latter into retracted position, centrally-apertured cover means enclosing the stationary spool positioned and adapted to direct the line axially thereof, a sleeve mounted on the first shaft for rotational movement relative thereto and reciprocal movement axially thereof, a rotatable spool having a central hub splined to the sleeve to permit conjoint rotational and relative axial movement therebetween, a cam disk mounted on the sleeve for rotational movement therewith in axially-spaced relation to the hub of the rotatable spool, said cam disk being positioned and adapted in an extended axial position of the sleeve to move the bail means from retracted to extended position upon rotation of the first shaft, and said cam disk in a retracted axial position of the sleeve releasing said bail means for movement into retracted position, compression spring means mounted on the sleeve between the cam disk and the hub of the rotatable spool normally biasing said sleeve into extended position, bail-retraction means operatively connected to the sleeve and adapted upon actuation to shift said sleeve axially from extended to retracted position, a second shaft journalled for rotation in spaced parallel relation to the first shaft, a hand crank connected to the second shaft, first and second axially-spaced gears carried by the second shaft, a third gear carried by the hub of the rotatable spool in a common plane with the first gear, a fourth gear carried by the first shaft in a plane common with the second gear, and clutch-forming means operative to selectively interconnect the hand crank with the rotatable spool or the bail-carrying means, said clutch-forming means comprising a rocker arm carrying a fifth gear in the plane of the first and third gears and a sixth gear in the plane of the second and fourth gears, said rocker arm in the first operative position thereof completing a driving connection between the first and third gears with the fifth gear while simultaneously disconnecting the second and fourth gears, and said rocker arm in a second operative position completing a driving connection between the second and fourth gears with the sixth gear while simultaneously disconnecting the fifth gear from one of the first and third gears.

2. The combination spinning and fly reel as set forth in claim 1 in which the fifth gear is continuously meshed with the first gear and the sixth gear is continuously meshed with the second gear in both operative positions of the rocker arm.

3. The combination spinning and fly reel as set forth in claim 1 in which a bearing is provided in the annular space between the first shaft and the hub of the stationary spool and attached to the latter, and in which the hub of the rotatable spool is journalled for rotation in said bearing.

4. The combination spinning and fly reel as set forth in claim 1 in which the rotatable spool includes a central cylindrical cavity of greater diameter than the stationary spool, and said stationary spool is received within said cavity leaving a continuous circumferential gap between said spools adapted for passage of a spinning line over the edge of said one radial flange.

5. The combination spinning and fly reel as set forth in claim 1 in which the rocker arm is T-shaped providing both a stem and a cross-bar portion, the free end of the stem portion is pivotally attached to the second shaft and the fifth and sixth gears are mounted for rotation on opposite extremities of the stem portion and on opposite sides thereof, the axes of rotation of the first and fifth gears being spaced apart a distance equal to the sum of the radii of said second and sixth gears.

6. The combination spinning and fly reel as set forth in claim 1 in which a stop is carried by the clutch-forming means for movement therewith, said stop being operative in the first position of the rocker arm to engage the bail-retraction means and prevent actuation of the latter to move the sleeve from extended into retraction position.

7. The combination spinning and fly reel as set forth in claim 1 in which the bail-carrying means is generally cup-shaped to provide circumferential skirt, said skirt including an aperture adapted to pass the bail means, and in which the bail means comprises a slide block mounted for radial slidable movement within the cup-shaped bail-carrying means and a pick-up pin carried by said slide block in position to move through the aperture in the circumferential skirt.

8. The combination spinning and fly reel as set forth in claim 1 in which the cam disk includes a pair of diametrically located cam surfaces on a face thereof that engage the bail means, each of said cam surfaces comprising a generally involute step adapted to engage said bail means and move the latter radially outward onto a circular edge of said disk upon rotation of the latter.

9. The combination spinning and fly reel as set forth in claim 1 in which the bail retraction means comprises a lever mounted for rockable movement about a point intermediate the ends thereof, one end of said lever being operatively connected to the sleeve.

References Cited in the file of this patent
UNITED STATES PATENTS

| | | |
|---|---|---|
| 2,723,808 | Elliott et al. | Nov. 15, 1955 |
| 2,862,679 | Denison et al. | Dec. 2, 1958 |
| 2,931,592 | Sloan | Apr. 5, 1960 |